WEAR RESISTANT MAGNETIC RECORDING MEMBER
Filed Nov. 4, 1964
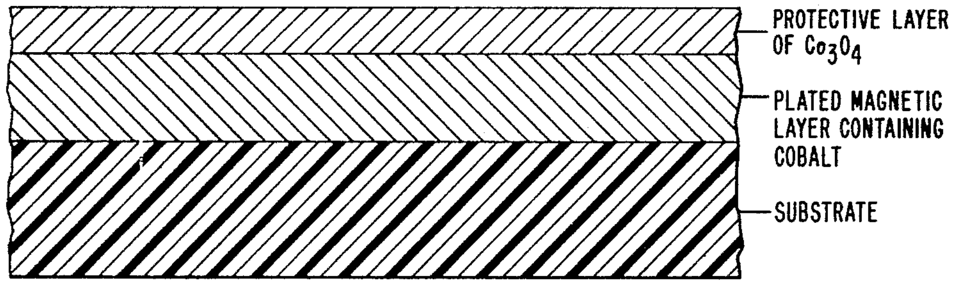
INVENTORS
GEOFFREY BATE
JOHN S. JUDGE
JOHN R. MORRISON
DENNIS E. SPELIOTIS
BY Donald W. Margolis
ATTORNEY United States Patent Office 3,460,968 Patented Aug. 12, 1969

3,460,968

WEAR RESISTANT MAGNETIC RECORDING MEMBER

Geoffrey Bate, Poughkeepsie, John S. Judge and John R. Morrison, Wappingers Falls, and Dennis E. Speliotis, Poughkeepsie, N.Y., assignors to International Business Machines Corporation, New York, N.Y., a corporation of New York Filed Nov. 4, 1964, Ser. No. 408,776
Int. Cl. B44d 1/44; H01b
U.S. Cl. 117—62 7 Claims

ABSTRACT OF THE DISCLOSURE

A magnetic record member including a magnetizable cobalt containing metal or alloy portion having formed in place thereon a continuous wear resistant $Co_3O_4$ surface by controlled oxidation of the cobalt containing portion. The method of producing a wear resistant magnetic record member by subjecting a record member having a magnetizable cobalt containing metal or alloy portion to temperatures in the range of 40° C. to 150° C. in the presence of water vapor to produce a continuous layer of wear resistant $Co_3O_4$ in place on the cobalt containing portion.

BACKGROUND OF THE INVENTION

This invention relates to magnetic recording members for use in magnetic recording systems. It relates more particularly to making magnetic recording members containing cobalt as a magnetic material and having a protective cobaltosic oxide ($Co_3O_4$) coating thereon.

One of the greatest problems in utilizing magnetic metal plated magnetic recording members is the susceptibility of the magnetic media to corrosion, impact and wear. Such magnetic recording members are used in various magnetic recording systems and find a high degree of use, for example, in electronic data processing systems. Such electronic data processing systems use plated magnetic material on tapes, discs, drums, loops, strips, and even as stripes on paper cards and other paper records.

During use, these various magnetic recording members are subjected to extreme conditions of impact and strain which tend to cause them to wear, sometimes catastrophically, and to corrode.

For example, magnetic tapes and drums utilized in electronic data processing systems pass and repass the magnetic transducer head at speeds of hundreds of inches per second. Systems of this type may be of either the "contact" or "non-contact" variety. In a contact system the transducer is in substantially continuous direct contact with the magnetic media, and as would be expected, there is a high degree of frictional wear causing undesirable breakdown of both the transducer and the plated magnetic metal. In a non-contact system the transducer normally skims a few microns above the magnetic media, supported by a thin film of air. There is a distinct tendency for the floating transducer to sink from time to time with resulting high speed impact of the transducer with the plated magnetic material. Such impacts cause wear or actual breakdown and destruction of portions of the plated magnetic metal. In a similar manner, the transducer in a contact system may occasionally be thrown out of contact with the magnetic media and recontact the plated magnetic metal in such a manner as to cause extraordinary wear or breakdown and destruction of the plated magnetic metal. Once destruction of a portion of the plated material is realized, subsequent deterioration of the entire magnetic recording member is imminent and follows quickly.

Magnetic metal plated discs may also be utilized in electronic data processing systems. It is not uncommon for magnetic discs in such systems to be stacked, one above the other, and spun at speeds of about 1200 r.p.m. to be read by a magnetic transducer head, which, in a non-contact system, is swiftly moving from place to place on a cushion of air above the rapidly spinning disc. It is not uncommon for the transducer to make physical contact with the spinning disc, thus tending to substantially abrade and rupture the magnetic material or at least to cause the magnetic material to wear. Magnetic discs may also be used in contact systems in which the transducer rides directly upon the disc. This again presents a constant problem of frictional wear of the magnetic media and also of high impact destructive recontact when the transducer is momentarily thrown out of contact with the disc. In both contact and non-contact disc systems, the smashing of the transducer into the disc can roughen the surface, scrape away plated magnetic metal and obiliterate the information thereon.

Similarly other types of plated magnetic metal recording members are subject to such shocks, scraping, and buffeting during their use that wear poses a great threat to them in terms of useful life. As used herein, the term "plated" is intended to include metal deposited by electroplating, electroless plating, gas plating, vacuum deposition and sputtering.

Many attempts have been made to solve the above-enumerated problems of plated magnetic metal wear and destruction. Perhaps, the most common method of attempting to avoid such magnetic recording member wear and destruction is by the deposition of a protective layer or lubricant upon the plated magnetic metal of the recording member to serve as a buffer intermediate the transducer and the magnetic media. While this approach is sound in principle, it has never been utilized in a truly practical manner. At the very least, the protective layer approach has previously entailed a separate manufacturing step requiring additional material which must be disposed upon the magnetic member in a thin, smooth, continuous layer. Furthermore, since the magnetic record members are subject to the high speed abrasive action of transducers riding over them millions of times, not only must the protective coatings be hard, thin, uniform, and corrosion resistant, but they must also adhere tenaciously to the plated magnetic metal. A protective coating which would easily peel or flake under adverse conditions would be of no real protection to the magnetic media. Additionally, the prior art protective coatings, when scratched remain damaged and do not heal.

The prior art use of lubricants to minimize the problems due to frictional wear and impact has not been entirely satisfactory. While lubricants do reduce friction, they do not serve to protect the material, nor even to substantially cushion it from high speed impacts. Additionally, lubricants tend to accumulate dust and loose magnetic material on the tape, and even worse, at the magnetic head. This debris can in turn cause severe damage to the magnetic material in an avalanching effect. Loose debris forms a lubricant bonded glomerate on the head, which glomerate grows and begins to scratch more debris from the recording member. Once this glomeration begins, the end of useful life of the recording member is near. A specific solid lubricant, molybdenum disulfide ($MoS_2$) which has been widely utilized to significantly reduce wear of magnetic members has recently been found to be undesirable for this purpose since it increases the rate of corrosion of the magnetic material. $MoS_2$ also causes an appreciable reduction of magnetic moment and a charge of coercivity of magnetic members, especially under conditions of high temperature and humidity.

Therefore, it is an object of the present invention to overcome the above-enumerated shortcomings of previous protective layers and lubricants.

It is another object of this invention to make a thin and uniform wear resistant protective intermediate layer upon a magnetic metal plated recording member without the necessity of using additional material.

It is still another object of this invention to produce a plated magnetic member having a wear resistant self-healing protective layer which decreases friction between the magnetic member and the magnetic transducer head.

Another object of this invention is to provide a novel magnetic recording member having a greatly improved wear and corrosion resistant overlayer of $Co_3O_4$.

The foregoing and other objects, features and advantages of the invention will be apparent from the following, more particular description of a preferred embodiment of the invention, as illustrated in the accompanying drawing which is an enlarged, cross-sectional view of a record member made in accordance with the present invention.

To achieve the above and solve the prior art problems as described, the instant invention generally involves a novel technique for oxidizing a plated magnetic metal containing cobalt to produce a thin protective oxide coating upon the exterior of the magnetic material.

Generally, the present invention involves a novel technique for producing a thin, uniform, self-healing, friction reducing, corrosion resistant, hard, protective overlayer upon cobalt containing material by oxidizing said material under controlled conditions of temperature and humidity. More specifically, a method is provided by which cobal containing plated magnetic members are placed in an oxidizing atmosphere having a controlled moisture content at a temperature and for a period of time sufficient to produce a protective overlayer of $Co_3O_4$. The following description and specific examples of preferred embodiments will detail and describe the method utilized in producing the wear resistant magnetic members. The following specification also sets forth the new and improved recording member produced by this invention.

In each of the following examples, a qualitative analysis was made of the surface structure of the magnetic recording member after treatment in accordance with the present invention. The method used for the study of the surface structure is electron reflection/diffraction. This technique gives a reliable tool for studying the composition of thin films. To obtain an electron diffraction pattern of a material, an electron beam is directed onto the surface of the sample at grazing incidence. The resulting diffraction pattern is primarily due to transmission of the electrons through the tips of very small surface projections. The samples were positioned inside an electron microscope. A combination of rotation and slight tilting made it possible to obtain a diffraction pattern from each sample. Measurements of the patterns indicated in each sample that the surface material was cobalt (II, III) oxide, $Co_3O_4$. In no case was unoxidized metal found on the surface.

There is a distinctive color change of the magnetic recording member during the process. When the $Co_3O_4$ has been formed, the member takes on a golden-red hue. This is surprising since $Co_3O_4$ is normally dark brown to black and is often referred to as "black oxide." However, the electron reflection diffraction tests show conclusively that this golden-red surface material is $Co_3O_4$. It is of further interest to note that soaking a cobalt containing member containing cobalt in deionized or distilled water results in imparting a similar golden-red color to the member. However, electron reflection/diffraction tests indicate that the resulting coating is not $C_3O_4$.

Example I

A cobalt-phosphorous alloy (97% Co=3% P) was electrolessly plated upon a length of polyethylene terephthalate tape to a thickness of about 10 $\mu$in. to form a magnetic recording member. A length of the thus produced magnetic tape was stored without undergoing further treatment. The remainder of the tape was placed in a temperature-humidity chamber (80° C.-90% rel. hum.) for a period of about 10 hours. The treated tape was found to have a thin uniform coating of $Co_3O_4$ adherently secured upon its plated surface. The $Co_3O_4$ tape showed superior durability and greatly improved useful life when tested in comparison with the untreated control length of tape.

Example II

A cobalt-nickel alloy (80% Co-20% Ni) was electroplated upon a pair of rigid metal drums to a thickness of about 20 $\mu$in. to form a pair of magnetic recording members. One of the thus produced drums was stored without undergoing further treatment. The second drum was placed in a temperature-humidity chamber (40° C.-60% rel. hum.) for a period of about 150 hours. The treated drum was found to have a thin uniform coating of $Co_3O_4$ adherently secured upon its plated surface. The $Co_3O_4$ coated drum showed superior durability and greatly improved useful life when tested in comparison with the untreated control drum.

Example III

A cobalt-nickel-phosphorous alloy (50% Co-48% Ni-2% P) was electrolessly plated upon a pair of brass discs to a thickness of about 15 $\mu$in. to form a pair of magnetic recording members. One of the thus produced magnetic discs was stored without undergoing further treatment. The second disc was placed in a temperature chamber (150° C.) and treated with steam for a period of about 3 hours. The thus treated disc was found to have a thin uniform coating of $Co_3O_4$ adherently secured upon its plated surface. The $Co_3O_4$ coated disc showed superior durability and greatly improved useful life when tested in comparison with the untreated control disc.

Example IV

Cobalt metal was vacuum plated upon a pair of polyethylene terephthalate loops to a thickness of about 15 $\mu$in. to form a pair of magnetic recording members. One of the thus produced loops was stored without undergoing further treatment. The second loop was placed in a temperature-humidity chamber (70° C.-80% rel. hum.) for a period of about 60 hours. The thus treated loop was found to have a thin uniform coating of $Co_3O_4$ adherently secured upon its plated surface. The $Co_3O_4$ coated loop showed superior durability and greatly improved useful life when tested in comparison with the untreated control loop.

Example V

A cobalt-phosphorous alloy (96% Co-4% P) was electrolessly plated upon a length of polyethylene terephthalate tape to a thickness of about 10 $\mu$in. to form a magnetic recording member. A length of the thus produced magnetic tape was stored without undergoing further treatment. The remainder of the tape was placed in a temperature-humidity chamber (43.5° C.-80% rel. hum.) in an atmosphere of pure oxygen for a period of about 2 hours. The thus treated tape was found to have a thin uniform coating of $Co_3O_4$ adherently secured upon its plated surface. The $Co_3O_4$ coated tape showed superior durability and greatly improved useful life when tested in comparison with the untreated control length of tape.

Example VI

A cobalt-nickel-phosphorous alloy (89% Co-10% Ni-1% P) was electrolessly plated upon a length of polyethylene terephthalate tape to a thickness of about 5 $\mu$in. to form a magnetic recording member. A length of the thus produced magnetic tape was stored without undergoing further treatment. The remaining length of tape was wound on a reel and placed in a temperature-humidity chamber (60° C.-50% rel. hum.) for a period of about 140 hours. The thus treated wound tape was found to have a thin uniform coating of $Co_3O_4$ adherently secured upon its plated surface. The $Co_3O_4$ coated tape showed superior durability and greatly improved useful life when tested in comparison with the untreated control length of tape.

Example VII

A cobalt nickel alloy (70% Co-30% Ni) was electroplated upon a pair of rigid metallic drums to a thickness of about 30 $\mu$in. to form a pair of magnetic recording members. One of the thus produced magnetic drums was stored without undergoing further treatment. The second drum was placed in a temperature-humidity chamber (50° C.-70% rel. hum.) for a period of about 100 hours. The thus treated drum was found to have a thin uniform coating of $Co_3O_4$ adherently secured upon its plated surface. The $Co_3O_4$ coated drum showed superior durability and greatly improved useful life when tested in comparison with the untreated control drum.

Example VIII

A cobalt-phosphorous alloy (95% Co-5% P) was electrolessly plated upon a pair of discs to a thickness of about 40 $\mu$in. to form a pair of magnetic recording members. One of the thus produced magnetic discs was stored without undergoing further treatment. The second disc was placed in a temperature-humidity chamber (90° C.-80% rel. hum.) for a period of about 20 hours. The thus treated disc was found to have a thin uniform coating of $Co_3O_4$ adherently secured upon its plated surface. The $Co_3O_4$ coated disc showed superior durability and greatly improved useful life when tested in comparison with the untreated control disc.

Example IX

A cobalt-nickel-phosphorus alloy (58% Co-40% Ni-2% P) was electrolessly plated upon a length of polyethylene terephthalate tape to a thickness of about 15 $\mu$in. to form a magnetic recording member. A length of the thus produced magnetic tape was stored without undergoing further treatment. The remaining length of tape was placed in a temperature-humidity chamber (80° C.-92% rel. hum.) for a period of about 9 hours. The thus treated tape was found to have a thin uniform coating of $Co_3O_4$ adherently secured upon its plated surface. The $Co_3O_4$ coated tape showed superior durability and greatly improved useful life when tested in comparison with the untreated control length of tape.

Example X

A cobalt-nickel alloy (90% Co-10% Ni) was electroplated upon a length of polyethylene terephthalate tape to a thickness of about 20 $\mu$in. to form a magnetic recording member. The length of the thus produced magnetic tape was stored without undergoing further treatment. The remaining length of tape was placed in a temperature-humidity chamber (40° C.-85% rel. hum.) for a period of about 60 hours. The thus treated tape was found to have a thin uniform coating of $Co_3O_4$ adherently secured upon its plated surface. The $Co_3O_4$ coated tape showed superior durability and greatly improved useful life when tested in comparison with the untreated control length of tape.

Example XI

A cobalt-phosphorus alloy (98% Co-2% P) was electrolessly plated upon a length of polyethylene terephthalate tape to a thickness of about 6 $\mu$in. to form a magnetic recording member. A length of the thus produced magnetic tape was stored without undergoing further treatment. The remainder of the tape was placed in a temperature-humidity chamber (43.5° C.-80% rel. hum.) for a period of about 100 hours. The thus treated tape was found to have a thin uniform coating of $Co_3O_4$ adherently secured upon its plated surface. The $Co_3O_4$ coated tape showed superior durability and greatly improved useful life when tested in comparison with the untreated control length of tape.

Summary

In summary, the above specific examples indicate that magnetic recording members containing cobalt as a magnetic material can have their wear characteristics greatly improved by the formation of a $CO_3O_4$ protective layer on the surface of the magnetic material. The examples further teach that such a $Co_3O_4$ protective layer can be formed by subjecting a magnetic recording member containing cobalt to temperatures in the range of about 40° C. to about 90° C. in an oxidizing atmosphere having about 50% to 92% relative humidity. Additionally, Example III teaches that the process is operative at higher temperatures if steam is utilized. The reaction conditions shown in the examples were constant to within ±1.5° C. and ±5% relative humidity. While a large number of specific examples are set out above, it must be apreciated that they merely represent preferred embodiments of the present invention and are in no way intended to limit the scope of the invention. For example, while only a few cobalt alloys are specifically shown, it is apparent to one skilled in the art that there are a great many alloys of cobalt which would be acceptable in this invention. Similarly, while several specific substrates are shown, the substrate is not critcal to this invention, except in terms of limitations it may impose due to its own characteristics. For example, relatively low temperature unstable and thermoplastic material such as polyethylene terephthalate imposes a practical limitation on the temperatures used since it is thermoplastic at about 115° C. and becomes mechanically degraded above a temperature of about 80° C. Therefore, there is a practical preferred operating range of about 40–70° C. when polyethylene terephthalate is the substrate. With the exception of such practical limitations, the various substrates useable in this invention are limited merely by engineering choice. In fact, one form of this invention may be practiced without any substrate whatsoever. That is, this invention now makes it possible to form $Co_3O_4$ in a simple new manner. It is believed that $Co_3O_4$ has not previously been formed from cobalt containing material at the low temperatures of the present method. The available chemical literature reports the formation of $Co_3O_4$ at temperatures in the range of 240–280° C. There are no known reports of its formation at temperatures as low as the experimental temperature range shown, i.e., 40° C.–150° C. Of course, without this low temperature production of $Co_3O_4$ it would also be impossible to utilize the present invention with low temperature unstable and thermoplastic substrates.

Other factors shown in the examples which are not critical to the invention are the thickness of the coating and the reaction time. The experimental times shown in the specific examples represent a great deal of excess in terms of the time it would take to produce a $Co_3O_4$ layer of sufficient thickness to offer adequate protection. The protective overlayers produced were on the order of about 0.5–1 $\mu$in. thick. However, a $Co_3O_4$ layer of molecular thickness would affect substantially all of the protection necessary or desired. Such a molecular layer would be a fraction of the thickness of the layers produced in the specific examples (on the order of the about 0.01 $\mu$in.), and would, of course, be produced in a fraction of the time. Conversely, continuing the reaction for a longer time than shown in the examples will have no adverse effects on the product. The reaction temperature and atmosphere also affect the reaction time of the process. As would be expected, the higher the temperature the faster the reaction proceeds. Also, as shown in Example V, an oxygen (or other oxidizing agent) enriched atmosphere will enhance the reaction rate.

It is interesting to note that temperature-humidity chambers have previously been widely used to promote artificial aging and concomitant breakdown of many items, including magnetic recording members. Therefore, it is quite surprising to discover that such facilites can now be used to produce magnetic recording members which are corrosion resistant and capable of greatly improved wear. However, during the reaction actual contact of water in liquid form with the plated metal should be avoided as it may lead to a combination of plated metal dissolution, hydroxide formation and corrosion which will make the magnetic recording member unuseable. Proper circulation of air and control of temperature variations in the process chamber during the reaction will avoid unwanted condensation. With proper precautions, relative humidity even greater than 92% may be used successfully in the reaction.

It has been observed that when members coated with a protective layer of $Co_3O_4$ are scratched, either intentionally or during use, the scratch tends to head. The healing takes form of the growth of a continuous sealing filling within the confines of the scratch. While the exact reasons of this healing action is not known, it is hypothesized that the scratched are represents a point of high anodic potential with respect to the remaining $Co_3O_4$ coating. This encourages oxidation of the exposed area. This healing action can be used to sustain the useful life of a slightly damaged magnetic member if it is allowed to rest for a short period of time. Healing of this type may prevent a small injury from becoming a major breakdown.

Other advantages of the present invention have been noted. It has been found that the presence of the $Co_3O_4$ overlayer reduces friction between the magnetic member and the transducer. This action of $Co_3O_4$ as a solid lubricant, as well as a protective overlayer is a substantial additional benefit, especially in contact systems. It has also been observed that the coercivity of the magnetic recording members is increased by the reaction method. Additionally, the $Co_3O_4$ layer provides the member with improved corrosion resistance.

While the invention has been particularly described with reference to preferred examples thereof, it will be understood by those skilled in the art that the foregoing and other changes in form, method and details may be made without departing from the spirit and scope of the invention.

We claim:

1. The method of producing a wear resistant magnetic recording member having a magnetic portion including cobalt containing material selected from the group consisting of cobalt metal and cobalt alloys, including the step of subjecting a recording member having a magnetic surface portion including cobalt containing material to controlled temperature conditions in the range of about 40° C. to about 150° C. in an oxidizing atmosphere having a controlled moisture content for a period of time sufficient to form a continuous $Co_3O_4$ protective overlayer in place on the magnetic cobalt containing surface portion.

2. The method of claim 1 wherein the magnetic portion is formed by plating.

3. The method of claim 1 wherein the temperature is about 40° C. to about 90° C. and the relative humidity is about 50% to about 92%.

4. The method of producing a wear resistant magnetic recording member comprising the steps of:

producing a magnetic recording member having a surface portion, including cobalt containing material selected from the group consisting of cobalt metal and cobalt alloys; and then subjecting the magnetic recording member to controlled temperature conditions in the range of about 40° C. to about 150° C. in an oxidizing atmosphere having a controlled moisture content to form a continuous $Co_3O_4$ protective overlayer in place on the magnetic cobalt containing surface portion.

5. The method of claim 4 wherein the magnetic recording member is produced by electroless deposition upon a flexible dielectric resin substrate, and the controlled temperature conditions are in the range of about 40° C. to about 90° C., and the controlled moisture content is in the range of about 50% to about 92% relative humidity.

6. A wear resistant magnetic recording member comprising:

a substrate;

a plated magnetic layer secured upon the substrate, said magnetic layer, including cobalt containing material selected from the group consisting of cobalt metal and cobalt alloys; and a continuous protective layer of $Co_3O_4$ adherently secured upon the magnetic layer and formed in place thereon.

7. The article of claim 6 wherein the substrate is a flexible dielectric resin.

References Cited

UNITED STATES PATENTS

| | | | |
|---|---|---|---|
| 2,803,570 | 8/1957 | Hespenheide | 148—6.35 |
| 2,923,684 | 2/1960 | Ingraham | 252—62.54 X |
| 3,102,048 | 8/1963 | Gran et al. | 117—61 |
| 3,109,749 | 11/1963 | Di Ricco. | |

FOREIGN PATENTS

| | | |
|---|---|---|
| 457,095 | 5/1949 | Canada. |

OTHER REFERENCES

Mellor: A Comprehensive Treatise on Inorganic and Theoretical Chemistry, 577–579.

MURRAY KATZ, Primary Examiner

B. D. PIANALTO, Assistant Examiner

U.S. Cl. X.R.

117—71, 107, 121, 138, 237, 240